US012104577B2

(12) United States Patent
Christiansen et al.

(10) Patent No.: US 12,104,577 B2
(45) Date of Patent: Oct. 1, 2024

(54) BLADE FOR A WIND TURBINE AND WIND TURBINE

(71) Applicant: Siemens Gamesa Renewable Energy A/S, Brande (DK)

(72) Inventors: Thomas Lehrmann Christiansen, Aalborg (DK); Donato Girolamo, Voorhout (NL)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/858,790

(22) Filed: Apr. 27, 2020

(65) Prior Publication Data

US 2020/0355164 A1 Nov. 12, 2020

(30) Foreign Application Priority Data

May 9, 2019 (EP) ..................... 19173556

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F03D 80/301* (2023.08); *F03D 1/0679* (2023.08)

(58) Field of Classification Search
CPC ...................................... F03D 80/30
See application file for complete search history.

(56) References Cited

U.S. PATENT DOCUMENTS 7,040,864 B2 * 5/2006 Johansen ............... H02G 13/00
416/146 R
7,922,454 B1 * 4/2011 Riddell ................. F03D 1/0675
416/224

(Continued)

FOREIGN PATENT DOCUMENTS

CN 101336342 A 12/2008
CN 101668945 A 3/2010

(Continued)

OTHER PUBLICATIONS

English translation of EP2930358B1 (Year: 2018).*

(Continued)

*Primary Examiner* — Woody A Lee, Jr.
*Assistant Examiner* — Wesley Le Fisher
(74) *Attorney, Agent, or Firm* — Schmeiser, Olsen & Watts LLP (57) ABSTRACT

Provided is a blade for a wind turbine including at least one blade component, wherein at least one section of the blade component facing the tip of the blade is carbon fiber reinforced, wherein the blade further includes a lightning protection arrangement with a discharging conductor extending along the blade to discharge an electric current caused by a lightning striking into the blade, wherein the lightning protection arrangement includes at least one, electrically conductive, elongated and flat lightning receptor which is electrically connected with the discharging conductor, wherein the lightning receptor is arranged at or near the outer surface of the blade and located between the at least one blade component section and the blade tip and extends at least partially from a trailing edge towards a leading edge of the blade.

16 Claims, 4 Drawing Sheets

(56) References Cited

U.S. PATENT DOCUMENTS

| | | | |
|---|---|---|---|
| 8,142,157 B2* | 3/2012 | Kita | F03D 80/00 416/224 |
| 8,449,259 B1* | 5/2013 | Kaser | F03D 80/30 416/146 R |
| 8,562,296 B2* | 10/2013 | Arocena De La Rua | F03D 80/30 416/146 R |
| 8,939,726 B2 | 1/2015 | Grabau | |
| 9,689,377 B2* | 6/2017 | Klein | F03D 80/40 |
| 9,702,338 B2* | 7/2017 | Richers | F03D 80/30 |
| 10,871,150 B2* | 12/2020 | Jensen | F03D 80/30 |
| 10,883,479 B2* | 1/2021 | Whitehouse | F03D 1/0675 |
| 2009/0139739 A1 | 6/2009 | Hansen | |
| 2009/0246025 A1* | 10/2009 | Lewke | F03D 1/0675 416/146 R |
| 2010/0090472 A1* | 4/2010 | Berthelsen | F03D 80/30 290/55 |
| 2012/0003094 A1 | 1/2012 | Hansen | |
| 2013/0149154 A1* | 6/2013 | Kuroiwa | B29C 70/304 416/146 R |
| 2013/0272892 A1* | 10/2013 | Liu | F03D 80/30 416/225 |
| 2016/0090968 A1* | 3/2016 | Hansen | F03D 1/0675 416/146 R |
| 2019/0195203 A1* | 6/2019 | Fujioka | F03D 1/0675 |
| 2022/0034305 A1* | 2/2022 | Aubrion | F03D 1/0677 |

FOREIGN PATENT DOCUMENTS

| | | | | |
|---|---|---|---|---|
| CN | 102365454 A | | 2/2012 | |
| CN | 103250314 A | | 8/2013 | |
| CN | 105209753 A | | 12/2015 | |
| EP | 2551517 A2 | | 1/2013 | |
| EP | 2754891 A1 | | 7/2014 | |
| EP | 2930352 A1 | * | 10/2015 | ........... F03D 1/0675 |
| EP | 2712472 B1 | * | 12/2015 | ............ F03D 80/30 |
| EP | 3106657 A1 | | 12/2016 | |
| EP | 2930358 B1 | * | 8/2018 | .......... F03D 1/0675 |
| EP | 3483424 A1 | | 5/2019 | |
| EP | 3501808 A1 | | 6/2019 | |
| EP | 3594494 A1 | | 1/2020 | |
| EP | 3597911 A1 | | 1/2020 | |
| WO | WO 2008101506 A2 | | 8/2008 | |
| WO | WO 2011080177 A1 | | 7/2011 | |
| WO | WO-2013084374 A1 | * | 6/2013 | ............ B29C 70/08 |
| WO | WO-2018019350 A1 | * | 2/2018 | .......... F03D 1/0675 |
| WO | WO-2019048535 A1 | * | 3/2019 | ............ B64C 3/185 |

OTHER PUBLICATIONS

English translation of EP2930352A1 (Year: 2015).*
European Search Report and Written Opinion of the European Searching Authority issued Oct. 25, 2019 for Application No. 19173556.2.

* cited by examiner

BLADE FOR A WIND TURBINE AND WIND TURBINE

CROSS-REFERENCE TO RELATED APPLICATIONS

This application claims priority to European Application No. 19173556.2, having a filing date of May 9, 2019, the entire contents of which are hereby incorporated by reference.

FIELD OF TECHNOLOGY

The following relates to a blade for a wind turbine comprising at least one blade component, wherein at least one section of the blade component facing the tip of the blade is carbon fiber reinforced, wherein the blade further comprises a lightning protection arrangement with a discharging conductor extending along the blade to discharge an electric current caused by a lightning striking into the blade.

BACKGROUND

Since rotor blades of a wind turbine are typically the highest and uppermost components of a wind turbine, these components of the wind turbine have the largest probability of getting struck by lightnings during thunderstorms. To avoid damage on the wind turbine or on the blades, wind turbines and/or their blades typically comprise lightning protection arrangements to discharge a lightning striking the blade. Lightning conductors like lightning rods or knobs or bolts or the like of the lightning protection arrangement are positioned at the surfaces and especially at the tips of the blades. The lightning conductors are electrically connected with a discharging conductor. A lightning striking into the lightning conductor will be discharged to the ground via the discharging conductor which is connected with a cable extending downwards along a tower of the wind turbine to the ground.

Recently, carbon fiber reinforced blade components have been introduced in the design of blades, as load carrying elements, but also as functional elements such as heating elements for de-icing systems of the blade. These carbon fiber reinforced blade components are typically carbon fiber reinforced polymers, which are electrically conductive. This conductivity potentially leads to problems concerning lightning strikes. It is possible that a lightning directly strikes into the carbon fiber reinforced blade component instead of the receptor. The probability for this is even larger for carbon fiber reinforced blade components with tapered end sections. Since an electric current caused by a lightning striking into the carbon fiber reinforced blade component potentially leads to a serious damage, there is the need to protect the carbon fiber reinforced blade component from lightning strikes. Until today some approaches have been developed for this purpose.

One is to provide diverter strips which are mounted close to the lightning conductors of the lightning protection arrangement on the surface of the blade. These diverter strips increase the effective area and, hence, the attraction effect for lightnings of the respective lightning conductor. However, diverter strips provide the disadvantage that these components are exposed to wear and tear since they are typically located on the surface of the blade.

Another approach is to provide a metal mesh between the carbon fiber reinforced blade component and the blade surface preventing the lightnings from reaching the carbon fiber reinforced blade component. However, a lightning striking into the mesh will probably lead to a significant damage at least on the mesh. This results in the need of a maintenance or replacement of the respective component.

SUMMARY

An aspect relates to an alternative and enhanced concept for protecting blades, especially for protecting the carbon fiber reinforced components, from being damaged by lightnings strikes and for being more robust towards wear and tear.

To solve this problem, a blade as depicted above is characterized in that the lightning protection arrangement comprises at least one, electrically conductive, elongated and flat lightning receptor which is electrically connected with the discharging conductor, wherein the lightning receptor is arranged at or near the outer surface of the blade and located between the at least one blade component section and the blade tip and extends at least partially from a trailing edge towards a leading edge of the blade.

The wind turbine typically comprises a tower, wherein on top of the tower a nacelle is mounted, which houses a generator to generate electric power. The generator is connected with a hub of the wind turbine, wherein the hub is rotatable about a horizontal rotational axis. The blades of the wind turbine typically comprise an elongated shape, wherein a root of the blade is mounted on the hub. The tip of the blade is the end section of the blade on the opposite side of the blade regarding the blade root.

The blade comprises a carbon fiber reinforced blade component. As already described above, the carbon fiber reinforced blade component may contribute to the mechanical stability of the respective blade, in particular for reinforcing the blade regarding flap loads and/or bending loads on the blade. Additionally, or alternatively, the carbon fiber reinforced blade component can be a heating element for de-icing systems or the like. Typically, the carbon fibers, which can also be a carbon fiber mesh or other suitable structures with carbon fibers, are incorporated into the blade component, which often consists of a polymer. The carbon fiber reinforced blade component is reinforced by carbon fibers throughout its complete geometrical structure, i.e., the carbon fiber reinforced blade component extends from the blade root as far towards the blade tip as possible to reduce the weight of the blade. Alternatively, the carbon fibers are provided only partially within the blade component at a certain blade component section or several certain blade component sections.

Independently from the current rotational position of the hub and, hence, of the blade, the probability for a certain position on the blade of getting struck by a lightning increases with a decreasing distance of this position to the blade tip. Hence, the position with the highest probability to be struck by a lightning is the tip of the blade. Other positions of the blade to be struck by a lightning are, because of the electrical conductivity of the carbon fibers, the positions where the carbon fiber reinforced blade components are typically located. It is even more likely for the carbon fiber reinforced blade components to get struck by a lightning, if the tip of this component which faces the tip of the blade is an acute chamfer.

Wind turbines or blades of wind turbines, respectively, typically comprise lightning protection arrangements to protect the wind turbine from being hit by a lightning at a random blade position leading to serious damage of the affected components of the wind turbine. The lightning protection arrangement comprises at least one, especially rod- or bold-head-like, lightning conductor which is a component for a lightning to strike the wind turbine. The lightning conductor, which is only an optional feature of embodiments of the present invention, will be described later in more detail.

The discharging conductor of the lightning protection arrangement, especially a cable or the like, is electrically connected with the lightning conductor. The discharging conductor is connected with a grounding system of the wind turbine providing an electrical path to the ground for the current of a lightning striking into the lightning conductor. The lightning protection arrangement is adapted to discharge the current of the lightning without being damaged.

Embodiments of the present invention increases the protection for the carbon fiber reinforced blade component from being struck by a lightning and from being damaged by this event. For this purpose, the electrically conductive, elongated and flat lightning receptor is provided. The lightning receptor is located between the carbon fiber reinforced blade component section and the blade tip, i.e. at a position on the blade with a larger probability to get struck by a lightning compared to the position where the carbon fiber reinforced blade component section is typically given. Hence, a lightning potentially striking the carbon fiber reinforced blade component will therefore be attracted by the lightning receptor and will rather strike the lightning receptor instead. Thus, the presence of the lightning receptor decreases the probability or likelihood for the carbon fiber reinforced blade component of getting struck by a lightning and, hence, of being damaged by the respective electric current. The lightning receptor acts as a lightning protection means and lightning shielding means for the carbon fiber reinforced blade component.

Since the blade typically rotates together with the hub, the direction from which a lightning potentially strikes the blade continuously changes. To avoid rotational blade positions, where the lightning receptor is located on a side on the blade where lightnings will probably not strike it, the lightning receptor extends at least partially from the trailing edge towards the leading edge of the blade. The trailing edge and the leading edge extend at least partially along the blade between the blade root and the blade tip. The leading edge is the edge of the blade facing into the wind direction. The trailing edge is the edge of the blade, which is averted to the wind direction. Since the lightning receptor is elongated and flat and extends from the trailing edge towards the leading edge, meaning that the longitudinal axis of the lightning receptor and the leading/trailing edge are tilted to each other (perpendicular), the number of rotational positions of the blade, where the lightning receptor does not face into the direction from where lightnings typically strike into the blade, are reduced significantly compared to the case, that the only rod- or bolt- or knob-like lightning conductors are provided along the blade.

The lightning receptor must not necessarily cover the complete distance between the leading edge and the trailing edge, but can also be spaced apart from these edges. However, the more of the space between the trailing edge and the leading edge is covered by the lightning receptor, the smaller the probability is for the carbon fiber reinforced blade component of getting struck by a lightning and thus the better the carbon fiber reinforced blade component is protected.

Since the lightning receptor is arranged at or near the outer surface of the blade, the lightning receptor is not significantly electrically shielded to the outside, which would lead to an undesired decrease of the probability of a lightning striking into the lightning receptor. Also in the case that the lightning receptor is located near the surface of the blade, i.e. that the lightning receptor might be embedded into the structure of a blade, covered by exemplarily a thin protection layer or the like, the lightning receptor can be close enough to the surface of the blade to attract lightnings.

In an embodiment, the lightning receptor is or comprises a band or a plate or a stripe. Such components are easy to fabricate and to mount on the blade. The lightning receptor may have a width between 30 and 100 mm and a thickness between 1 and 3 mm. The lightning receptor may be made of a metal, e.g. of copper, bronze, aluminium, steel, alloys or the like. The dimensions and/or the material of the lightning receptor is selected based on requirements to lightning arc erosion, conductivity and properties regarding the corrosion of the lightning receptor.

In addition to a band- or a plate- or a stripe- or a mesh-like structure of the lightning receptor, other planar or flat structures can be used for the lightning receptor. Alternatively, the lightning receptor can have the structure of a torus or a ring or a segment of a torus or a ring. Generally, the longer and the larger the area of the lightning receptor is, the better the lightning receptor protects or shields the carbon fiber reinforced blade component from being struck by a lightning.

For a blade according to embodiments of the present invention, the at least one lightning receptor can be, seen in the direction towards the blade tip, spaced apart from the at least one carbon fiber reinforced blade component. The distance between the section of the blade component which is reinforced by carbon fibers and the lightning receptor is, on the one hand, small enough that the attraction effect of the lightning receptor still concerns the area of the carbon fiber reinforced blade component section significantly. If this distance would be too large, the lightning receptor cannot act as a shielding or protection means of the carbon fiber reinforced blade component. On the other hand, the distance between the carbon fiber reinforced section of the blade component and the lightning receptor should be large enough, that flash-overs between the lightning receptor and the carbon fiber reinforced blade component due to a possible voltage difference do not occur.

Regarding the distance between the carbon fiber reinforced blade component section and the blade tip, the lightning receptor is spaced apart from the carbon fiber reinforced blade component section by a distance exemplarily between 5 and 50%, between 10 and 20%, of the distance between the carbon fiber reinforced blade component section and the blade tip. Exemplarily, the blade can comprise a total length of 55 meters, wherein the carbon fiber reinforced blade component section can end 8 m apart from the blade tip. In this case, the lightning receptor can be located about 7 m apart from the blade tip, exemplarily 6.875 m. In this context, one of the most important parameters is the distance between the carbon fiber reinforced blade component section and the lightning receptor. This distance is typically in the range between 5 centimetres and 2 metres, between 10 centimetres and 70 centimetres.

The lightning receptor can be adjacent to the carbon fiber reinforced blade component or the blade component section, wherein in this case the touching surfaces of these components should be electrically insulated.

In embodiments of the present invention, the lightning protection arrangement comprises at least two lightning receptors each extending at least partially from the trailing edge towards the leading edge of the blade, wherein at least two of the at least two lightning receptors are arranged on opposite sides of the blade. As already mentioned, since the blade is rotating, lightnings potentially strike the blade from any direction relative to the blade. Since the blade is covered by lightning receptors on both sides, the probability for the carbon fiber reinforced blade component being struck by a lightning is further decreased. The at least two lightning receptors are arranged at a front side and a back side of the blade. As already mentioned, the wind strikes the blade at its leading edge, wherein the wind subsequently follows the contour of the blade along the front side of the blade and leaves the blade at its trailing edge.

The at least one lightning receptor can extend from the trailing edge to the leading edge at the front side of the blade and, subsequently, from the leading edge to the trailing edge at the rear side of the blade. Since the blade is, similarly to the embodiment with two lightning receptors which are provided on opposite sides of the blade, covered by the lightning receptor on both sides, in this embodiment the probability for the carbon fiber reinforced blade component being struck by a lightning is also further decreased and, hence, the protection of the carbon fiber reinforced blade component is enhanced. In this case, the lightning receptor encloses or surrounds the blade, wherein the lightning receptor extends along the complete or the large part of the circumference of the blade.

The at least one lightning receptor is electrically connected with the discharging conductor by a conductive block, especially by a metal block, of the lightning protection arrangement located inside the blade. The conductive block can be connected with the discharging conductor via an electric insulated cable and optionally via an electrical T-connection piece. The conductive block is positioned at or near the trailing edge of the blade, wherein the lightning receptor is electrically connected to the conductive block at its side facing the trailing edge of the blade. The conductive block acts as an electric connection means between the lightning receptor and the discharging conductor, without significantly increasing the electrical resistance of the grounding path of the electric current of the lightning.

The lightning protection arrangement can comprise at least one electrically conductive lightning conductor protruding the outer surface of the blade, wherein the lightning conductor is electrically connected with the discharging conductor. The lightning conductor can be a rod- or bolt- or knob-like protrusions from the outer surface of the blade with an especially mushroom-shaped contour. Several lightning conductors are positioned along the surface of the blade, wherein the lightning conductors are mostly concentrated close to the blade tip where the blade is getting struck by a lightning with the highest probability.

The lightning conductor can be electrically connected with the discharging conductor by the conductive block. In this embodiment, the conductive block acts as a common electrical attachment means connecting the lightning receptor as well as lightning conductor with the discharging conductor.

The lightning receptor and/or the lightning conductor can be attached to the conductive block by an attachment means, especially by a screw. This provides a simple possibility to detachably attach the lightning receptor and/or the lightning conductor to the conductive block. For the screw an electrically conductive material like metal or the like can be used.

In embodiments of the invention, the lightning receptor and the lightning conductor are attached to the conductive block by a common attachment means, especially by a common screw. In this embodiment, the lightning conductor is directly in contact with the lightning receptor, wherein the lightning conductor protrudes from the flat lightning receptor. Hence, the lightning receptor acts as an enlargement of the effective area of the lightning conductor increasing the probability of getting struck by a lightning. The lightning conductor can also be located at the surface of the lightning receptor without the conductive block but with any other kind of suitable electrical connection means between these components and the discharging conductor.

In an embodiment, the at least one lightning receptor is laminated into the blade. By this, the lightning receptor does not influence the aerodynamic properties of the blade negatively. Additionally, or alternatively, the at least one lightning receptor can be covered by a layer, especially by a glass fiber layer. In this embodiment, the lightning receptor is protected from negative external influence like corrosion or erosion or the like. Additionally, the lightning receptor is mechanically stabilized and further attached to the blade by getting laminated into the blade and/or by the layer.

In the following, the method of producing a possible embodiment of the blade according to embodiments of the present invention, where the lightning receptor extends from the trailing edge to the leading edge at the front side of the blade and, subsequently, from the leading edge to the trailing edge at the rear side of the blade, will be described in detail:

First, the glass fiber layer, which can be a glass fiber mat or the like, is laid into a lower blade mould. On the upper side of the glass fiber layer, the lightning receptor is positioned such that the glass fiber layer overlaps the lightning receptor. The lightning receptor is conformed to the shape of the mould and, hence, to the outer shape of the blade. Both, the glass fiber layer and the lightning receptor protrude from lower blade mould over the leading edge of the blade.

Assuming that the lightning receptor comprise exemplarily a length of 590 mm, a width of 100 mm, the glass fiber layer can comprise a width of 300 mm and a length of 790 mm to overlap the lightning receptor with full width and length.

Next, the conductive block is placed at the trading edge and connected to the lightning receptor by a metallic screw.

Next, the structural members of the blade, especially the carbon fiber reinforced blade component, but also electrical internal components like the discharging conductor etc. are placed in the mould at their respective positions. Furthermore, the discharging conductor is electrically connected to the lightning receptor by a cable. Optional internal mandrels are placed at their respective positions.

Next, the lightning receptor is wrapped around the structural members of the blade.

After this, the lightning receptor will be connected at the other side of the conductive block in the trailing edge of the blade using again a metallic screw.

Next, the glass fiber layer is wrapped around the metal band, an upper mould is positioned onto the lower mould and a vacuum will be applied to the cavity built by the moulds and the blade will be casted by infusing a resin or the like matrix material. After this, the lightning receptor is perfectly included into the outer shape of the blade.

Furthermore, embodiments of the present invention relate to a wind turbine comprising at least one blade or three blades, as described above. All features of the blade according to embodiments of the present invention and the explained advantages can be transferred to the wind turbine according to embodiments of the present invention.

BRIEF DESCRIPTION

Some of the embodiments will be described in detail, with references to the following Figures, wherein like designations denote like members, wherein.

DETAILED DESCRIPTION

Figure 1:
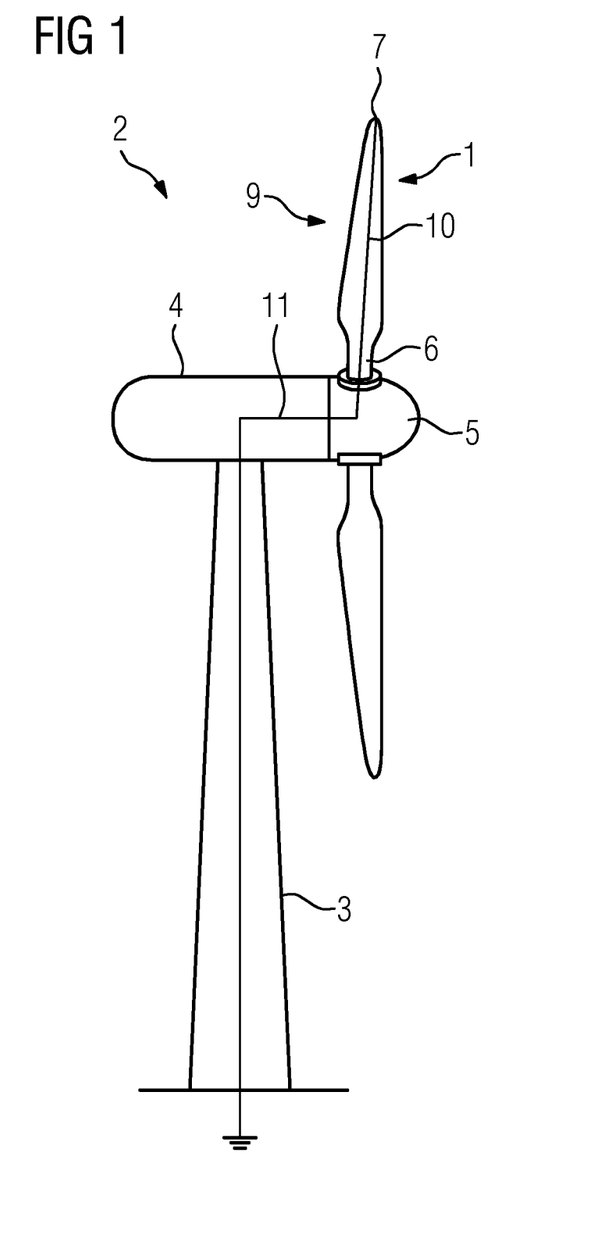
FIG. 1 a wind turbine according to embodiments of the present invention.

A blade 1 is typically part of a wind turbine 2 as shown in FIG. 1. The wind turbine 2 furthermore comprises a tower 3, a nacelle 4, which is mounted on top of the tower 3, and a hub 5, which is rotatable mounted on the nacelle 4. The three blades 1 of the wind turbine 2 comprise blade roots 6, wherein the blades 1 are mounted on the hub 5 at the blade roots 6. Each of the blades 1 comprises an elongated shape extending from the blade root 6 to a blade tip 7.

Figure 2:
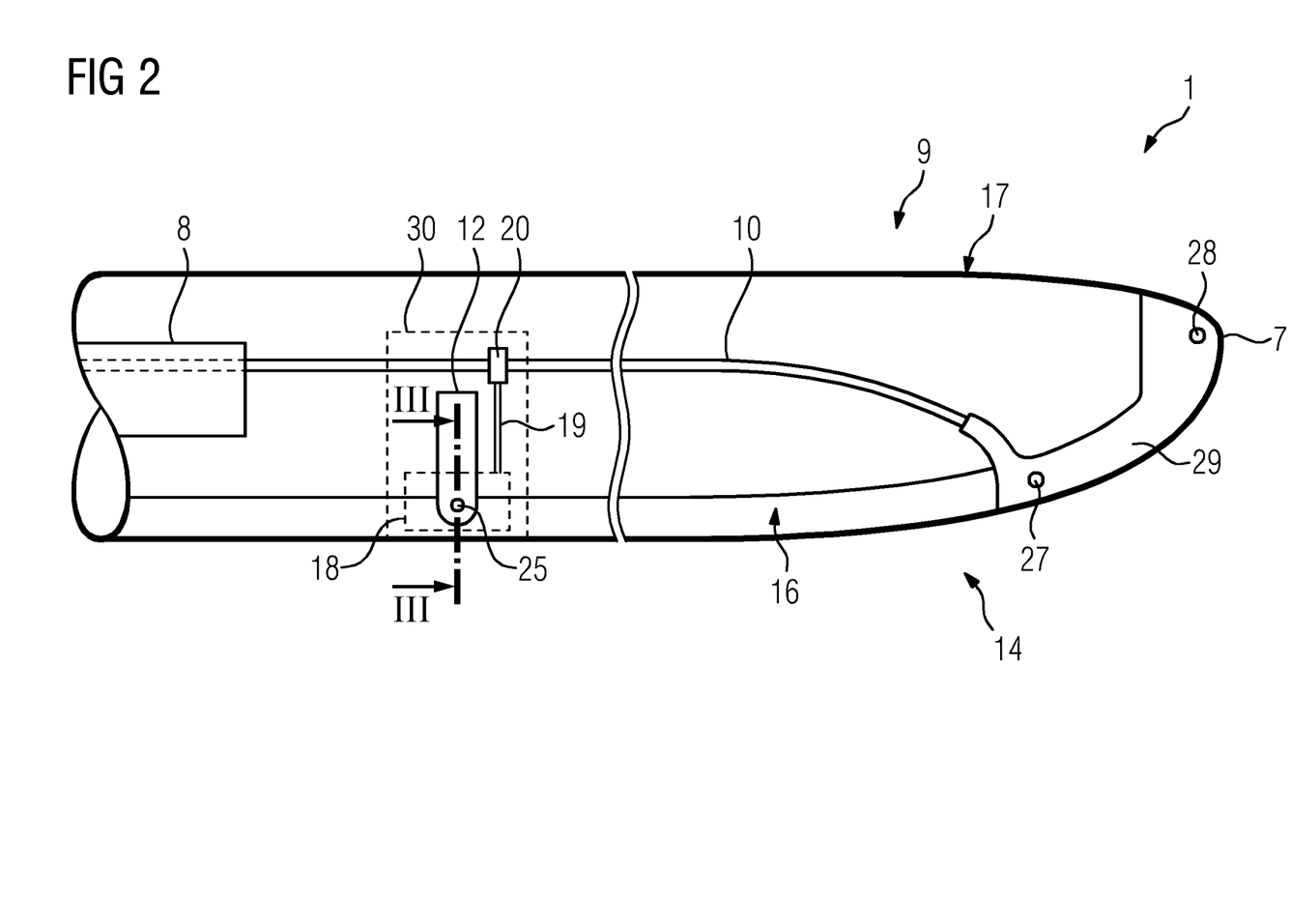
FIG. 2 a first embodiment of a blade according to embodiments of the present invention.

A detailed view of a first embodiment one of the three blades 1 of the wind turbine 2 is shown in FIG. 2. The blade 1 comprises one blade component 8, which is reinforced by carbon fibers (not shown) throughout its complete geometrical structure. Although the blade component 8 is reinforced by carbon fibers throughout its complete structure, it is also possible that the blade component 8 is only reinforced in one certain section. The carbon fiber reinforced blade component 8 contributes to the mechanical stability of the blade 1.

The blade comprises a lightning protection arrangement 9 with a discharging conductor 10, which is an electrically isolated cable, and which extends along the blade 1 and is electrically connected to a grounding cable 11 of the wind turbine 2.

The lightning protection arrangement 9 further comprises two lightning receptors 12, 13, which are exemplarily metal bands and connected with the discharging conductor 10. FIG. 2 only shows the lightning receptor 12, which is located on a rear side 14 of the blade 1. The lightning receptor 13 is positioned at the front side 15 of the blade 1. Both lightning receptors 12, 13 extend, regarding their longitudinal axis, partially from a trailing edge 16 towards a leading edge 17 of the blade 1. The wind strikes the blade 1 at its leading edge 17, follows the blade 1 along its front side 15 and leaves the blade 1 at the trailing edge 16. At the opposite side of the front side 15, the blade 1 comprises the rear side 14.

Generally, i.e. especially without the lightning receptors 12, 13, the probability for a lightning striking into a certain position into the blade 1 increases with a decreasing distance between this position and the blade tip 7. The presence of the lightning receptors 12, 13 decrease the probability or likelihood for a lightning to strike into the carbon fiber reinforced blade component 8, i.e. the lightning receptors 12, 13 act as a lightning protection or lightning shielding for the carbon fiber reinforced blade component 8.

The distance between the lightning receptors 12, 13 and the carbon fiber reinforced blade component 8 should be small enough that a lightning which would otherwise strike into the carbon fiber reinforced blade component 8 is attracted by the lightning receptors 12, 13. On the other hand, the distance between the carbon fiber reinforced blade component 8 and the lightning receptors 12, 13 should be large enough, that the lightning receptors 12, 13 do not attract lightnings which then, due to voltage differences, strike into the carbon fiber reinforced blade component 8. In summary, the probability for the damage of the carbon fiber reinforced blade component 8 by the current of a lightning striking into the blade 1 is decreased by the lightning receptors 12, 13.

Since the lightning receptors 12, 13 extend partially between the trailing edge 16 and the leading edge 17, and since one of the lightning receptors 12, 13 is located on each side 14, 15 of the blade 1, the lightning receptors 12, 13 provide an attractive position to be stroke by a lightning in all rotational positions of the blade 1 or the hub 5, respectively.

The lightning receptors 12, 13 are electrically connected with the discharging conductor 10 by a conductive block 18 which is a metal block located inside the blade 1 at its trailing edge 16. The conductive block 18 is electrically connected to the discharging conductor 10 via a cable 19 and an electrical T-connection piece 20.

The lightning receptors 12, 13 are attached to the conductive block by attachment means 21, 22, which are metallic screws. Furthermore, between the nut of the screws 21, 22 and the lightning receptors 12, 13, a washer 23 is provided to fill the gap between the conductive block 18 and the lightning receptor 12, 13 caused by an outer surface 24 of the blade 1. The washer 23 can consist of bronze, steel, copper, aluminium or another suitable material.

Figure 3:
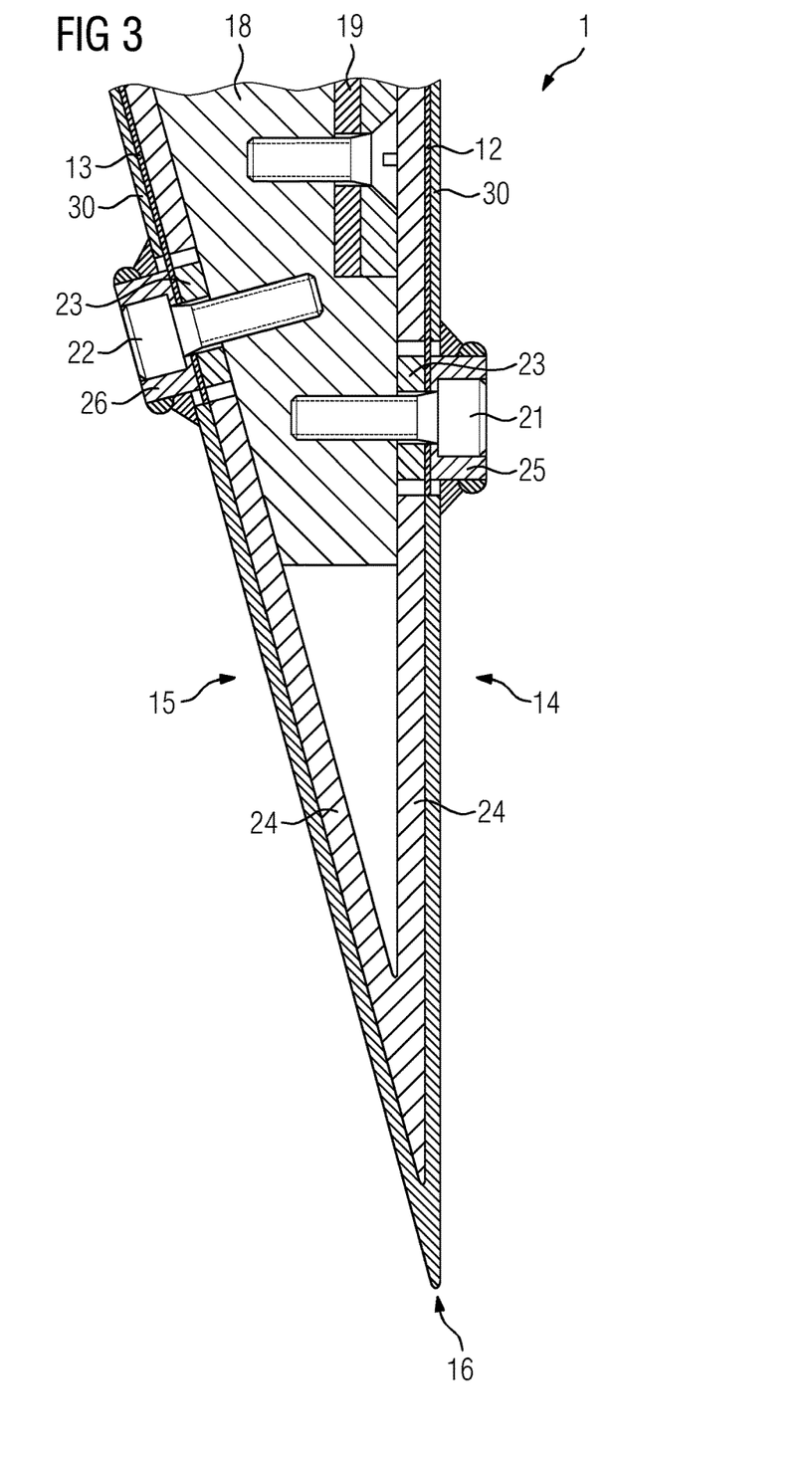
FIG. 3 a cross section of the blade of FIG. 2 along the line III-III.

The lightning protection arrangement 9 further comprises lightning conductors 25, 26, 27, 28 protruding the outer surface of the blade 1. The lightning conductors 25, 26, 27, 28 are exemplarily mushroom-shaped and are also points for lightnings to strike into the blade 1. The lightning conductors 25, 26, 27, 28 are electrically connected with the discharging conductor 10. As can be seen in FIG. 3, which shows a cut through the trailing edge of blade 1 along the line in FIG. 2, two of the lightning conductors 25, 26 are located on top of the outer surface of the lightning receptors 12, 13 and are also connected to the conductive block 18 via the attachment means 21, 22 and the washers 23. Additionally, the other two lightning conductors 27, 28 are provided on the tip 7 of the blade 1 together with an insulated tip core 29. The lightning conductors 27, 28 have the highest probability to be stroke by a lightning striking into the blade 1, since the lightning conductors 27, 28 are located on the tip of the blade where the probability for lightning strikes is the highest.

To protect the lightning receptors 12, 13 from corrosion and wear caused by weather conditions or the like, the lightning receptors 12, 13 are covered by a layer 30, which is exemplarily a glass fiber layer.

Figure 4:
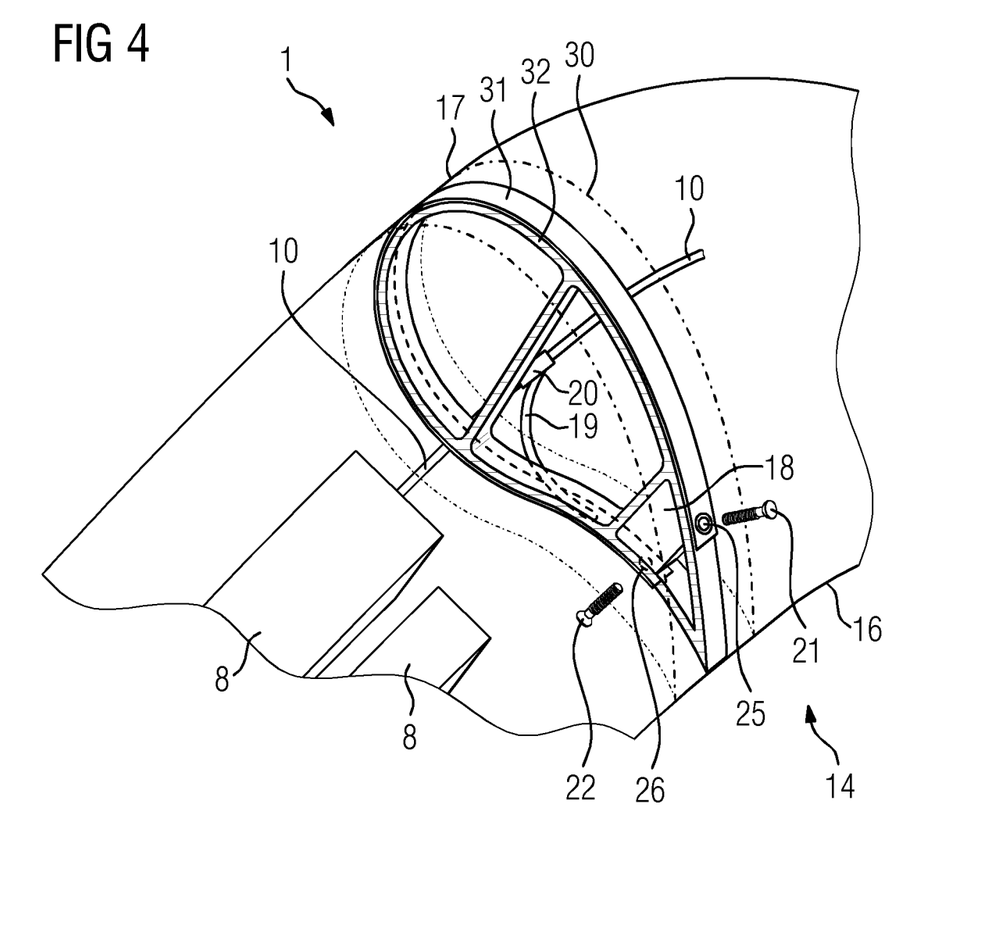
FIG. 4 a second embodiment of a blade according to embodiments of the present invention.

FIG. 4 shows a second embodiment of the blade 1 according to embodiments of the present invention, wherein the same components are named with the same reference numbers. In contrast to the blade 1 as shown in FIG. 2, the blade 1 in FIG. 4 comprises only one lightning receptor 31, wherein the lightning receptor 31 extends from the trailing edge 16 to the leading edge 17 at the front side 15 of the blade 1 and, subsequently, from the leading edge 17 to the trailing edge 16 at the rear side 14 of the blade 1.

The cross section as shown in FIG. 3 and all aspects described in this context do also hold in principle for the second embodiment of the blade 1 as shown in FIG. 4 only with the difference that the two lightning receptors 12, 13 are replaced by the one lightning receptor 31. All other aspects, especially regarding the conductive block 18 and the lightning conductors 25, 26 and the layer 30 etc. also holds for the blade 1 as shown in FIG. 4.

Furthermore, FIG. 4 shows that the lightning receptor 31 is positioned around the internal blade structure, whose cross section 32 extends throughout the full blade length. In analogy to this, the lightning receptors 12, 13 of the first embodiment of the blade 1 are also positioned partially around the internal blade structure.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade for a wind turbine, the blade having a blade tip and comprising:
    at least one blade component, wherein at least one section of the blade component facing the blade tip is reinforced by carbon fibers spanning a length of the blade past a root of the blade toward the blade tip and configured to reinforce the blade against bending loads on the blade, and
    a lightning protection arrangement with a discharging conductor extending along the blade to discharge an electric current caused by a lightning striking into the blade, wherein the lightning protection arrangement includes:
        at least one, electrically conductive, elongated and flat lightning receptor which is electrically connected with the discharging conductor, wherein the at least one elongated and flat lightning receptor is arranged at or near the outer surface of the blade and located between the at least one section of the blade component and the blade tip and extends at least partially from a trailing edge towards a leading edge of the blade, wherein the at least one elongated and flat lightning receptor is, seen in a direction towards the blade tip, spaced apart from the at least one section of the blade component to prevent flash-over, and
        at least one electrically conductive lightning conductor protruding from the outer surface of the blade, wherein the at least one electrically conductive lightning conductor is located at or near the blade tip and is electrically connected with the discharging conductor,
    wherein a distance between the carbon fibers and the lightning receptor is small enough that a lightning which would otherwise strike into the at least one blade component is attracted by the lightning receptor, and wherein the distance is large enough that the lightning receptor does not attract lightning which then strikes into the at least one blade component.

2. The blade according to claim 1, wherein the at least one elongated and flat lightning receptor is or comprises a band or a plate or a stripe.

3. The blade according to claim 1, wherein the lightning protection arrangement comprises at least two elongated and flat lightning receptors each extending at least partially from the trailing edge towards the leading edge of the blade, wherein at least two of the at least two elongated and flat lightning receptors are arranged on opposite sides of the blade.

4. The blade according to claim 1, wherein the at least one elongated and flat lightning receptor extends from the trailing edge to the leading edge at a front side of the blade and, subsequently, from the leading edge to the trailing edge at a rear side of the blade.

5. The blade according to claim 1, wherein the at least one elongated and flat lightning receptor is electrically connected with the discharging conductor by a conductive block of the lightning protection arrangement located inside the blade.

6. The blade according to claim 5, wherein the at least one electrically conductive lightning conductor protruding from the outer surface of the blade is electrically connected with the discharging conductor by the conductive block.

7. The blade according to claim 5, wherein the at least one elongated and flat lightning receptor and/or the at least one lightning conductor protruding from the outer surface of the blade is attached to the conductive block.

8. The blade according to claim 7, wherein the at least one elongated and flat lightning receptor and the at least one lightning conductor protruding from the outer surface of the blade are attached to the conductive block by a common attachment device.

9. The blade according to claim 5, wherein the conductive block is a metal block of the lightning protection arrangement located inside the blade.

10. The blade according to claim 1, wherein the at least one section of the blade component includes a heating element and/or deicing element.

11. The blade according to claim 1, wherein the at least one elongated and flat lightning receptor is laminated into the blade.

12. The blade according to claim 1, wherein the at least one elongated and flat lightning receptor is covered by a layer.

13. The blade according to claim 12, wherein the layer is a glass fiber layer.

14. A wind turbine comprising at least one blade according to claim 1.

15. The blade according to claim 1, wherein a distance between the carbon fibers and the lightning receptor is in the range between 5 centimetres and 2 meters.

16. The blade according to claim 15, wherein the lightning receptor is located about 7 meters apart from the blade tip.

* * * * *